Patented Mar. 21, 1939

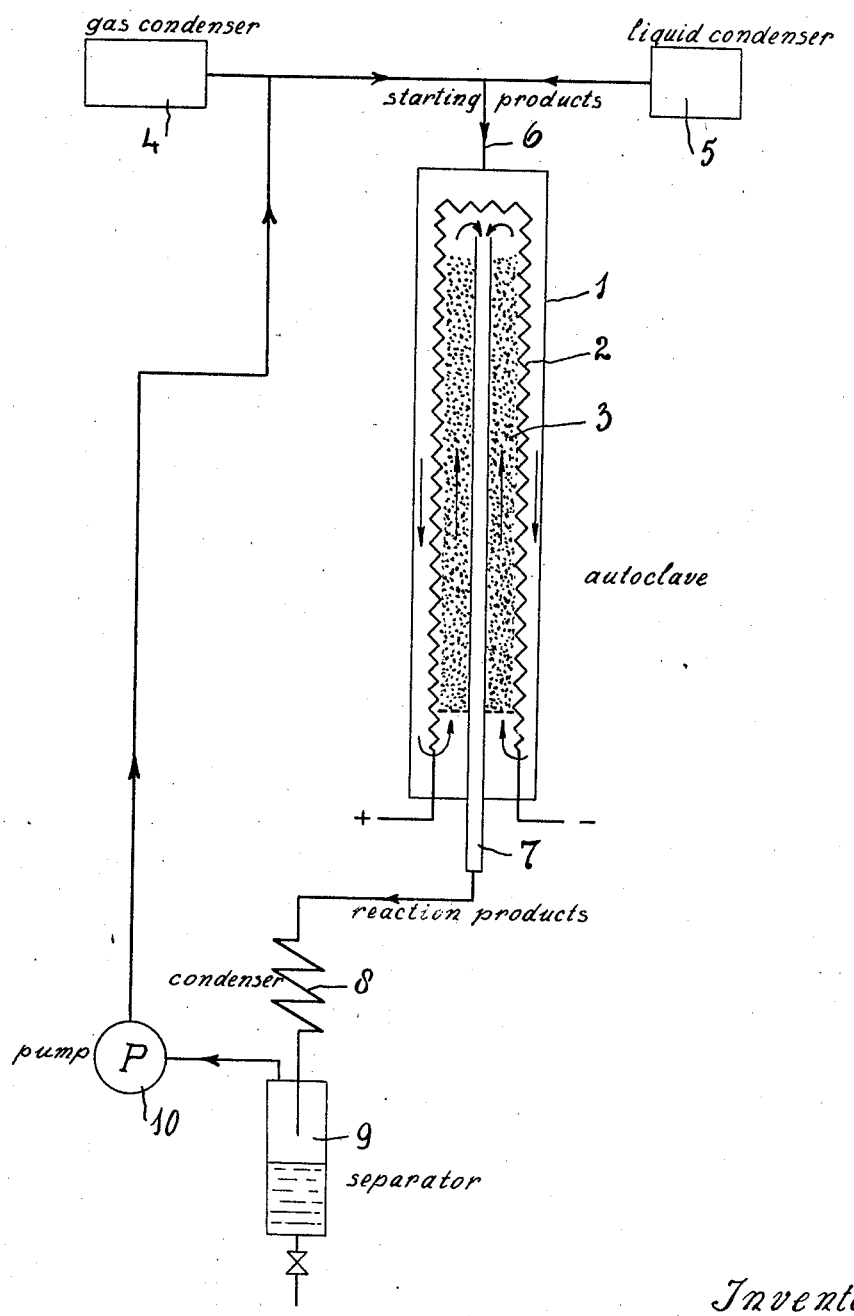

2,151,165

UNITED STATES PATENT OFFICE 2,151,165

PROCESS OF TREATING CARBON OR CARBONACEOUS COMPOUNDS

Eulampiu Slatineanu, Oberhausen, Germany, assignor to Gewerkschaft Auguste, Oberhausen, Germany, a company of Germany Application April 18, 1936, Serial No. 75,250
In Germany April 26, 1935

15 Claims. (Cl. 196—9)

My invention relates to the heat treatment of carbon and carbon compounds, including the hydrogen and oxygen compounds, for the production of valuable products of various kinds.

It is an object of my invention to produce valuable products and more especially hydrocarbons from carbonaceous materials such as carbon, for instance coal, or carbon compounds, including saturated and unsaturated hydrocarbons, which at room temperature may be solid or liquid or gaseous.

It is a particular object of my invention to produce valuable hydrocarbons, starting from coal of any provenience, such as mineral coal or brown-coal or charcoal or lignite, or peat, or from coal distillation products such as tar, or from other natural carbonaceous mineral deposits and their products such as mineral oils or any natural or artificial mixture of such substances. Under the collective denomination "mineral oil" I summarize in the first line petroleum, liquid condensates from natural gas, liquid or unguentous distillates or residues from petroleum, mineral wax or natural asphalt, in the second line distillates from brown-coal, bituminous slate, peat and mineral coal (crude tar).

My invention relates more particularly to the production of valuable compounds from carbonaceous materials by the action, at an elevated temperature and under high pressure, of methane.

The drawing affixed to the present specification and forming part thereof is a diagram illustrating by way of example the manner in which my invention may be carried out.

My invention is based on the discovery that the methane molecule, in contrast to all that could be expected, when acted upon by high pressure, is no longer an indifferent, but a highly reactive compound. I have ascertained that under the action of high pressure the methane will not only prevent $CH_4$ from being split off the compounds treated, but will even cause $CH_4$ to combine with the starting material or with the fragments, into which these materials were split. In certain cases a condensation occurs simultaneously. These reactions may be accompanied by a splitting up of carbon chains of the starting material.

The pressure required in the new process amounts as a rule to 500 atmospheres as a minimum. If, however, ethylene and/or acetylene are present in the gas mixture in a quantity amounting to about 20 per cent or more by volume, a pressure of about 250 atmospheres may be sufficient to render the methane highly reactive in the sense explained above. In many cases I prefer to choose the partial pressure of the methane far higher than the sum of the partial pressures of the gaseous compounds reacted with it.

The present invention is based on the idea that the dipol-free molecules of $CH_4$ are polarized, when acted upon by high pressure, i. e. when the electron shells are compressed.

In contradistinction to prior art processes a reaction temperature of 390° C. need not be overstepped, whereby the control of the operation is facilitated and the apparatus rendered simpler and less expensive.

The temperature limit, above which the desired reactions do not proceed any more with satisfactory yield, can be determined by means of the thermodynamic formulae of the free energies calculated for instance according to the method of Lewis and Randall. In certain cases, defined by the well known phase rule, the same is true of the limits of the molecular proportions of the reacting materials. I have found it advantageous as far as the yield is concerned, to determine the reaction temperature and the molecular proportions in such manner that the values of the free energies of the reactions intended to take place (if expressed according to Lewis and Randall remain within the range of $x$ and $+5000$ gcal. (gram-calories), wherein $x$ is a value, expressed in gcal., which must be less than $+5000$ gcal., no matter whether it is positive or negative. At a predetermined temperature the free energies are always equal to the expression:

$$-RT \ln K = DF$$

(D here stands for Δ).

DF corresponds to a figure ranging between $x$ and $+5000$ gcal.

If R is the gas constant, T the absolute temperature, $\ln$ Napier's logarithms, K the equilibrium constant, the formula, if Brigg's logarithm is used, will be $$-4.5753 \ T.\log K = DF.$$

From the constant K the total pressure can be computed according to the law of mass action as the sum of the partial pressures of the components of the equilibrium.

From the formula there thus results that the partial pressures of the components formed and simultaneously the yield rise, as the partial pressure of the methane rises. The rising pressure of the methane also favors the conversion of the free carbon, which may be present, into a non-solid phase.

The reaction may also be furthered and accelerated by adding suitable catalysts; however, in view of the high pressure the presence of catalysts is not necessary.

If this process is for instance applied to high molecular weight paraffine hydrocarbons, methane will combine with lower molecular weight fragments resulting from the splitting of the carbon chain. In the case of unsaturated hydrocarbons mainly a combination of methane takes place, accompanied by condensation. However, the reaction may also be so conducted that at the same time the starting material is split up into lower molecular weight compounds. Aromatic polycyclic compounds such as naphthalene, anthracene etc. can be converted under the influence of methane into lower molecular aromatic hydrocarbons and/or aliphatic compounds. Compounds containing oxygen also add methane and according to the starting material and the conditions of operation water may separate and a further condensation may take place or the starting material may be split into lower molecular weight compounds.

These examples merely serve for illustrating the invention without however limiting same, since the treatment of carbonaceous compounds with methane under pressure is capable of the widest technical application.

Instead of methane also gas mixtures containing methane may be used; obviously the partial pressure of the methane in the system must be kept correspondingly high.

If the methane or the gas mixture containing same also contains about 20% by volume of more ethylene or acetylene, the operation may also be carried through under a pressure of less than 500 and sometimes even down to 250 atmospheres. For similarly as carbon monoxide (CO) such unsaturated hydrocarbons are unstable molecules and the reaction is therefore not only stimulated by the pressure, but also by the potential energy of the unsaturated molecules.

In many cases it has been found advantageous to cause the reaction to take place in the heterogeneous system, i. e. in such manner that at least one of the reaction components already present or the final products formed remains liquid under the operating pressure.

The cleavage products (fragments) such as methane and its homologues, hydrogen, ethylene and its homologues, carbon monoxide, acetylene and its homologues, naphthalene, other tar constituents and solid carbon, which are formed in the hitherto known processes of conversion of carbonaceous materials, are not stable under the conditions of operation of the present process, but will react according to the following equations with the formation of liquid hydrocarbons:

1. $14CO + 9CH_4 \rightleftarrows 2C_8H_{18} + 7CO_2$
2. $7CO + 9CH_4 + 7H_2 \rightleftarrows 2C_8H_{18} + 7H_2O$
3. $7C_2H_4 + 2CH_4 \rightleftarrows 2C_8H_{18}$
4. $7C_2H_2 + 10CH_4 \rightleftarrows 3C_8H_{18}$
5. $C_{10}H_8 + C_2H_4 \rightleftarrows 2C_6H_6$
6. $C_{10}H_8 + 2C_2H_4 \rightleftarrows 2C_7H_8$
7. $C_{10}H_8 + C_2H_2 + CH_4 \rightleftarrows C_6H_6 + C_7H_8$
8. $6C_2H_4 + 3CH_4 + C \rightleftarrows 2C_8H_{18}$
9. $5C_2H_4 + 4CH_4 + 2C \rightleftarrows 2C_8H_{18}$
10. $7C_2H_4 + 4CH_4 + 5C \rightleftarrows 2C_8H_{18} + C_7H_8$
11. $7C_2H_2 + 19CH_4 + 7C \rightleftarrows 5C_8H_{18}$
12. $7C_2H_2 + 13CH_4 + 9C \rightleftarrows 3C_8H_{18} + 2C_6H_6$
13. $7C_2H_2 + 12CH_4 + 5C \rightleftarrows 3C_8H_{18} + C_7H_8$ In these equations only representatives of the different groups (paraffines, olefines, acetylene, naphthenes, naphthalenes, etc.) are shown. The reactions will occur in a similar manner with their homologues or derivatives. Obviously, each of these reactions can be carried out singly or a plurality of such reactions may be carried through in combination.

According to the laws of thermodynamics carbon may be formed in different ways when carrying through these processes. It need not be separated from a solid phase, but may also be formed for instance from carbon monoxide according to the equation:

$$2CO = CO_2 + C$$

If the gaseous phase contains hydrogen, the equilibrium $$CO + H_2 = H_2O + C$$

may also play a rôle.

Under the operating conditions the carbon thus separated will react with the higher molecular carbon compounds and also with the methane.

If carbon monoxide and hydrogen are present, the new process may also be explained thermodynamically in such manner that primarily the reaction $$CO + 2H_2 = CH_3OH$$

occurs and that thereafter the alcohol reacts with higher molecular organic carbon compounds and/or with methane for instance according to the equation:

$$CH_3OH + C_nH_{2n+2} = C_{n+1}H_{2n+4} + H_2O$$

These theoretical considerations were subjected to practical laboratory tests and it was found that under the conditions of this invention alcohols of any kind will in fact react with higher molecular organic carbon compounds and/or with methane for instance as follows $$C_nH_{2n+1}OH + C_nH_{2n+2} = C_{2n}H_{4n+2} + H_2O$$

Unsaturated hydrocarbons also have the tendency of separating carbon from the gaseous phase, for instance as follows:

(a) $\qquad C_2H_4 = CH_4 + C$
(b) $\qquad 2C_2H_2 = CH_4 + 3C$

In view of thermodynamic calculations the reaction between carbon monoxide and methane may also proceed by way of ethylene as follows:

$$2CO + CH_4 = C_2H_4 + CO_2$$

The ethylene will then however be decomposed again according to the equation (a). Consequently in this or similar reactions special provision must be made for preventing the separation of carbon.

This separation can be prevented by the following steps:

(1) The partial pressure of the methane must exceed by far the partial pressure of the gaseous component to be reacted with methane, and/or
(2) The reactions must proceed in a system which under the conditions of operation contains at least one liquid phase. This liquid phase may be added under the form of a suitable hydrocarbon, for instance paraffine oil.

For thermodynamic reasons carbon does not react with methane directly from a solid phase.

The manner in which the conditions of reaction are calculated may be illustrated for the example:

$$7C_2H_4 + 2CH_4 = 2C_8H_{18}$$

The value for $\overline{DF}$ is calculated as follows:

Since $\overline{DF}$ represents the value for the free energies, all components (heat of formation, specific heat, heat of vaporization etc.) have been considered therein, so that in contrast to the usual statement of the mere heat tone of a reaction, here the true excess of energy of the reaction is brought out.

The heat of formation (DH) of methane from graphite (C) and hydrogen ($H_2$) amounts at 291° absolute (18° C.) $=-18\,300$ gcal.

The value of the specific heat $C_p$ for methane is equal to $$2.57+0.0231\,T-0.000\,0042\,T^2 \text{ gcal.} \quad (1)$$

for $H_2$ the specific heat is equal to $$C_p=6.65+0.0007\,T \quad (2)$$

and for graphite is equal to $$C_p=1.1+0.0048\,T-0.000\,0012\,T^2 \quad (3)$$

If according to the equation $$C+2H_2 \rightarrow CH_4$$

the algebraic sum of (1), (2) and (3) is computed, there result $$-(2)-(3)+(1)=$$

$$DC_p=-11.83+0.0169\,T-0.000\,003\,T^2 \text{ gcal.} \quad (4)$$

The heat of formation of $CH_4$ from its elements at 0° absolute then is $$H_{291}=H_0-11.83\,T+$$
$$0.00845\,T^2-0.000\,001\,T^3 \quad (5)$$

Consequently $DH_0=-15\,500$ gcal.

From the equilibrium measurements of Lewis and Randall results the integration constant of the reaction isochore $$J=-52.07\pm0.17$$

The value of the free energy (DF) for $$C+2H_2 \rightarrow CH_4$$

is therefore $$DF=-15\,500+11.83\,ln\,T-$$
$$0.00845\,T^2+0.000\,005\,T^3-52.07\,T \quad (6)$$

If Napier's logarithm (*ln*, on the basis $e=2.71828\ldots$)

is replaced by Brigg's logarithm, the formula reads:

$$DF=-15\,500+27.24\,T\,log\,T-0.00845\,T^2+$$
$$0.000\,005\,T^3-52.07\,T \quad (7)$$

From this formula the column *a* of schedule 1 has been calculated.

If in a similar manner the free energy of the formation of acetylene from its elements according to the equation $$2C+2H_2 \rightarrow C_2H_4$$

is ascertained, there results the following formula: (The integration constant of the reaction isochore was assumed empirically as $J=-65$)

$$DF=17.680+11.1\,T\,ln\,T-0.0055\,T^2-65\,T$$

or $$DF=17\,680+25.56\,T\,log\,T-0.0055\,T^2-65\,T$$

Column *b* of schedule 1 was computed according to this formula.

In the case of octane the following calculation results:

$$8C+9H_2 \rightarrow C_8H_{18}$$

The specific heat for the liquid $C_8H_{18}$ (at 25° C.) is 0.5052, the molar heat capacity $C_p=57.66$. The specific heat of the paraffine series in the liquid and solid phases is proportional to the absolute temperature, thus for $C_8H_{18}$ $$C_p=0.193\,T$$

The entropy of melting is $$\frac{40.3\cdot114.4}{216.5}=21.2$$

(The heat of solution of paraffine-wax in petroleum distillates is 40.3 cal. per gram, which is identical with the heat of melting and must be independent from the molecular weight.)

The complete entropy for liquid $C_8H_{18}$ at 25° C. is $$S^0_{298}=0.193\cdot298+21.2=78.7$$

thus for $8C+9H_2$:

$$S^0_{298}=10.4+265=-275.4$$
$$\overline{DS^0_{298}=-196.7}$$

The heat of combustion of $C_8H_{18}$ is $1\,300\,700$ gcal. per gram/molecule.

The algebraic sum of the heat of combustion of the components and of octane result in the heat of formation $$H_{298}=-68\,000 \text{ galc.}$$

The free energy therefore is $$DF_{298}=DH-TDS=-9\,300$$

The vapor pressure of $C_8H_{18}$ at 25° C. is 15.4 mm.

The free energy of the vaporization of one molecule gaseous $C_8H_{18}$ is according to the following formula $$DF=-RT\,ln\,\frac{P}{760}=+2\,300$$

or $$-4.5753\,T\,log\,\frac{P}{760}=+2\,300$$

$$DF_{298}=-7\,000$$

At ordinary temperatures the heat capacity of liquid $C_8H_{18}$ is:

$$C_p=10+0.161\,T$$

$$DC_p=-58.6+0.122\,T$$

$$DH_{298}=DH_0-58.6\,T+0.061\,T^2=-68\,000$$

This results in $$H_0=-56\,000$$

$H_{298}=-69.65$ (at the absolute boiling point)

For liquid octane formed from its elements the equation for the free energy up to here reads as follows:

$$DF=-56\,000+58.6\,T\,ln\,T-0.061\,T^2-159.2\,T$$

or expressed in Brigg's logarithms:

$$DF=-56\,000+134.93\,T\,log\,T-0.061\,T^2-159.2\,T$$

$$DF_{298}=+19\,200$$

(for the liquid as well as for the vapor phase)

The specific heat of $C_8H_{18}$ vapor has never been published. It can be computed as follows:

The latent heat of vaporization is $DH_v=8060$ galc./g. mol at 125°C. (boiling point)

For hexane the latent heat of vaporization amounts to 6820 at 70° C. and to 7680 at 0° C.

Assuming that the increase of $DH_v$ at dropping temperature is the same with hexane and octane, $DH_v$ at 25° C. may be estimated as 9500 gcal.

The total heat capacity of the $C_8H_{18}$ vapor between 25° C. and 125° C. amounts, similarly as that of the liquid octane within this range of temperatures, to plus DHv at 125° C., minus DHv at 25° C. and with a correction for the Joule-Thomson-effect at 25° C. (=70 gcal.).

$$6242+8060-9\,500+70=4\,832$$

$$(\text{per °C.})C_p=\frac{4832}{100}=48.32$$

$$C_p=35+0.0383\ T$$

From (2), (3) and the last formula result:

$$\underline{D}C_p=-33.6$$

$$\underline{D}H=\underline{D}H_o-33.6\ T$$

$$\underline{D}H_{398}=\underline{D}H_o-69\,650=-61\,600\ \text{gcal.}$$

$$\underline{D}H_o=-48\,200$$

The free energy of the reaction-equation $$8C+9H_2=C_8H_{18}\ (\text{gas phase})$$

now reads in all $$\underline{D}F=-48\,200+33.6\ T\ ln\ T-53.4\ T$$

or when using decadic logarithms $$\underline{D}F=-48\,200+77.367\ T\ log\ T-53.4\ T$$

This formula was used in computing the column $c$ for octane.

The free energy of the reaction $$7C_2H_4+2CH_4=2C_8H_{18}$$

can now be computed from the schedule 1 by way of the algebraic sum $$-(7b+2a)+2c=d$$

For example for the temperature $T=640°$ absolute (367° C.) as follows:

$$-7(1973)+2(-3231.7)+2(56575)=-18\,518$$

Under the equation previously deducted:

$$\underline{D}F=-4.5753\ T\ log\ K=-18\,518$$

K is then computed as follows:

$$640(-4.5753).log\ K=-18\,518$$

$$-log\ K=\frac{-18\,518}{2928}=-6.325$$

$$K=\frac{(C_8H_{18})^2}{(CH_4)^2.(C_2H_4)^7}=2.114.10^6$$

With the aid of this formula the isobars may now be computed.

In order to further illustrate the invention, the computation for the reaction $$7CH_3OH+CH_4=C_8H_{18}+7H_2O$$

may be explained.

From the computation of the free energy and heat of formation results the free energy of the total reaction $$\underline{D}F°=-104\,660-92.68\ T\,lnT+\\0.118\ T^2-0.00000309\ T^3+600.11\ T$$

or $$\underline{D}F°=-104\,660-213.4\ T\,log\ T+\\0.118\ T^2-0.00000309\ T^3+600.11\ T$$

The free energies for the temperature ranges to be investigated are $$\underline{D}F_{500}=-63\,471.349$$
$$\underline{D}F_{550}=-61\,059.346$$
$$\underline{D}F_{600}=-58\,495.766$$
$$\underline{D}F_{650}=-55\,759.45$$
$$\underline{D}F_{700}=-52\,823.908$$

According to the equation $$\underline{D}F=-RT\ ln\ K=-RT.2.30556\ T\ log\ K$$

Schedule $$\underline{D}F=-RT\ ln\ K=-4.5753\ T\ log\ K$$

| | | a | b | c | d |
|---|---|---|---|---|---|
| t° C. | T° abs. | $C+2H_2=CH_4$ | $2C+2H_2=C_2H_4$ | $8C+9H_2=C_8H_{18}$ | $7C_2H_4+2CH_4=2C_8H_{18}$ |
| 187 | 460 | −7821 | +17 927 | +22 010.6 | −65 826 |
| 207 | 480 | −7327 | +18 108.5 | +25 739.3 | −60 627 |
| 227 | 500 | −6825 | +18 298 | +29 506.7 | −55 423 |
| 247 | 520 | −6320 | +18 483.5 | +33 274.2 | −50 196 |
| 267 | 540 | −5811 | +18 690 | +37 119 | −44 970 |
| 287 | 560 | −5299 | +18 892 | +40 963.8 | −39 718 |
| 307 | 580 | −4786 | +19 097 | +44 831.8 | −34 179 |
| 327 | 600 | −4270 | +19 306 | +48 723 | −29 156 |
| 347 | 620 | −3751.8 | +19 510 | +52 614.3 | −23 838 |
| 367 | 640 | −3231.7 | +19 733 | +56 575 | −18 518 |
| 387 | 660 | −2709.6 | +19 951 | +50 536 | −13 166 |

As basis for the computation of the thirteen type-reactions shown on page 2 the following formulae for the free energies of the starting materials were used.

| | |
|---|---|
| $C+O_2=CO_2$ | $DF=-94\,110+0.60\ TlnT-0.0065\ T^2+\\0.000\,00011\ T^3-2.30\ T$ |
| $C+\frac{1}{2}O_2=O$ | $DF=-26\,600-2.15\ TlnT+0.00125\ T^2-\\0.000\,0002\ T^3-7.48\ T$ |
| $H_2+\frac{1}{2}O_2=H_2O$ | $DF=-57\,410+0.94\ TlnT+0.00165\ T^2-\\0.000\,00037\ T^3+3.92\ T$ |
| $2C+H_2=C_2H_2$ | $DF=+54\,400+2.75\ TlnT-0.0033\ T^2-\\26.4\ T$ |
| $10C+4H_2=C_{10}H_8$ (naphthalene vapor) | $DF=+38\,540+21\ TlnT-0.01\ T^2-98\ T$ |
| $10C+4H_2=C_{10}H_8$ (naphthalene liquid) | $DF=+37.6\ TlnT-0.047\ T^2-160T$ |
| $6C+3H_2=C_6H_6$ (benzene vapor) | $DF=+24\,545+20\ TlnT-0.013\ T^2-\\97.4\ T$ |
| $6C+3H_2=C_6H_6$ (benzene liquid) | $DF=+14\,920+19.45\ TlnT-0.029\ T^2-\\61.3\ T$ |
| $7C+4H_2=C_7H_8$ (toluene vapor) | $DF=+19\,270+24\ TlnT-0.01\ T^2-109\ T$ |
| $7C+4H_2=C_7H_8$ (toluene liquid) | $DF=7\,950+21.3\ TlnT-0.0236\ T^2-\\58.17\ T$ | the several temperatures are computed as follows:

| T° abs. | Log K |
|---|---|
| 500 | 27.725023 |
| 550 | 24.246757 |
| 600 | 21.293026 |
| 650 | 18.735674 |
| 700 | 16.481498 |

The same calculation for ethyl alcohol shows the free energy of the reaction $$7C_2H_5OH+2CH_4=2C_8H_{18}+7H_2O$$

to amount to $$\underline{D}F°=-113\,630-92.19\ TlnT+0.12015\ T^2-\\0.00000359\ T^3+619.78\ T$$

It has already been pointed out farther above that the reactions proceed more readily, more completely, and in a more easily regulatable manner, if at least one liquid phase is present. Therefore one of the equilibrium components—either of the starting materials or of the products formed in the reaction—shall be liquid under the conditions of reaction. In the reactions mentioned above water will always appear as a component, since the plurality of these reactions proceed below the critical point of water, and therefore the liquid phase is here already present under the form of water. One may however also provide the liquid phase by injecting into the reaction chamber, besides the reaction components to be reacted in the first place, also substances which remain liquid under the reaction conditions, such as for instance paraffines, paraffine oil, vaselines, tar oils, etc. This addition is particularly useful in the case of reaction components having a tendency to separate out low molecular paraffines. In such case heavier paraffines added to the mixture will react with the light paraffines formed and will act towards carrying the reaction to completion within a technically admissible period of reaction.

The values for the free energies used in the examples of calculation given above are calculated for water vapor. In relation to liquid water the figures in goal must be reduced correspondingly.

The following are some examples illustrating the basic reactions:

1. $7CH_2=CH.CH_2OH$ (allyl alcohol) $+11CH_4= 4C_8H_{18}+7H_2O$

2. $(C_2H_5)_3COH$ (triethyl carbinol) $+CH_4= C_8H_{18}+H_2O$

3. $CH=C-C_5H_{11}CHOH$ (amyl-propiol alcohol) $+4CH_4=2C_8H_{14}+H_2O$

4. $C_6H_5OH$ (phenol) $+CH_4= C_6H_5.CH_3$ (toluene) $+H_2O$

5. $C_6H_4(OH)_2+2CH_4= C_6H_4(CH_3)_2$ (xylene) $+2H_2O$

6. $C_6H_4(OH)_2+2C_{15}H_{32}+2CH_4= C_6H_6+4C_8H_{18}+2H_2O$

7. $C_6H_5CH_2OH+CH_4=C_6H_5.C_2H_5+H_2O$

8. $C_6H_5-CH_2-OH+3CH_4+C_{20}H_{42}= C_6H_6+3C_8H_{18}+H_2O$

9. $7C_2H_6O_2$ (glycol) $+10CH_4=3C_8H_{18}+14H_2O$

10. $7C_3H_8O_3$ (glycerine) $+19CH_4= 5C_8H_{18}+21H_2O$

In the drawing 1 is an autoclave provided with an electric heater 2. 3 is a catalyst or contact mass arranged in the autoclave, 4 is a gas condenser, 5 designates a condenser for liquids. The condensed gases and liquids from the containers 4 and 5 enter the autoclave 1 at 6, the products of reaction leave it at 7. The way the materials travel through the autoclave is illustrated by arrows. 8 is a condenser, 9 is a separator for liquids, while 10 is a pump serving to keep the products circulating in the way shown by arrows.

In practising this invention one may proceed for instance as follows:

*Example 1*

In an autoclave such as used for instance in a hydrogenation process, 100 kg. paraffine oil per hour were treated at 350° C. under a pressure of about 1000 atm. with methane, the 100 kg. paraffine oil being the quantity which passed hourly through the apparatus. The catalyst present was composed of copper iodide, molybdenic acid and magnesium oxide. The hourly yield was 112 kg. benzines, about 80% of which were octane. The reaction thus proceeded substantially according to the formula

$C_{43}H_{88}+5CH_4=6C_8H_{18}$

*Example 2*

The paraffine oil was treated not with pure methane, but with a gas mixture containing besides methane about 30% hydrogen. The pressure was here raised to about 1500 atm. The percentage of yield was about the same as in Example 1.

*Example 3*

In the autoclave 100 kg. naphthaline were treated hourly at 330° C. and under a pressure of about 2000 atm. with methane in the absence of any catalyst, 10 kg. paraffine oil being however injected per 100 kg. naphthaline. The hourly yield was 65 kg. benzene and toluene and 99 kg. benzine, mostly octane.

*Example 4*

A gas mixture containing 40% by volume CO and 60% by volume $CH_4$ was reacted at 260 to 280° C. under a pressure of about 1000 atm. in a reaction chamber, the space available for the catalytical reaction amounted to about 30 liters and was filled with an iron-molybdenum catalyst. 30 cbm. of the gas mixture were reacted per hour and 5.3 kg. paraffine oil (boiling at about 360° C.) were injected per hour. The yield was 13.9 kg.=19.7 liters of a benzine, 93% of which boiled below 150° C. and which was free from unsaturated compounds. When the temperature was raised to 285 to 318° C., liquid olefines and naphthenes were formed.

*Example 5*

A gas mixture of 7 cbm. H, 7 cbm. CO and 21 cbm. $CH_4$ was reacted at 184 to 224° C. under about 1000 atm. pressure in a reaction space of about 30 liters in the presence of a tungsten-iron catalyst. Since here a liquid phase (water) was present, no paraffine oil or the like need be injected. The hourly yield was 10.3 kg.=15.5 liters benzine, 95% of which boiled below 170° C. Besides this 6 liters water were formed.

*Example 6*

A gas mixture of 4 cbm. ethylene and 4 cbm. methane was reacted per hour at 250 to 310° C. under a pressure of about 400 atm., the catalyst space of about 20 liters being filled with an iron-molybdenum catalyst and 4 kg. paraffine oil being injected per hour. The hourly yield was 10.3 kg.=14.5 liters of a benzine, 95% of which boiled below 170° C.

*Example 7*

A gas mixture consisting of 4.7 cbm. ethylene and 14.1 cbm. methane was reacted at 260 to 320° C. under 400 atm. pressure, the catalyst space of 20 liters containing an iron-molybdenum-sodium bromide catalyst. 4.8 kg. paraffine oil were injected per hour. The hourly yield was 15.4 kg.=21.9 liters benzine, 90% of which boiled below 170° C.

*Example 8*

11.5 kg. liquid paraffine and 4.25 kg. paraffine oil were passed per hour into the catalyst space of 20 liters volume containing an iron-molybdenum catalyst. The apparatus was kept under a pressure of 760 atm. by forcing in per hour a mixture of 2.5 kg.=2 cbm. ethylene and 6.7 cbm. methane. The temperature was kept at 180 to 260° C. There were obtained 14.8 kg. aromatic hydrocarbons mainly benzene and toluene and 3.0 kg. paraffine, mainly octane.

Example 9

Under the conditions described with reference to Example 8 and together with the paraffine oil 1 kg. finely ground mineral coal was injected per hour, however instead of 2 cbm. 6.7 cbm. ethylene were forced in per hour. There were obtained 14.6 kg. aromatic hydrocarbons, mainly benzene and toluene, and 12.7 kg. benzine, mainly octane.

The process may be carried through in an apparatus of the kind used for high pressure reactions, for instance in a hydrogenation apparatus as used in the Bergius-process.

Various changes may be made in the details disclosed in the foregoing specification without departing from the invention or sacrificing the advantages thereof.

I claim:

1. The process of producing hydrocarbons from carbonaceous materials, which comprises acting upon such material at an elevated temperature not exceeding 390° C. with a gas mixture, which contains a substantial proportion of methane, under a pressure of at least 500 atmospheres above normal which suffices to cause a polarization of the methane present.

2. The process of producing hydrocarbons from carbonaceous materials, which comprises acting upon such material at a temperature ranging between 180 and 390° C. with a gas mixture, which contains a substantial proportion of methane, under so high a pressure that the partial pressure of the methane amounts to at least 500 atmospheres.

3. The process of claim 2 in which coal of any kind is treated with methane in the presence of at least one liquid phase which is physically constant under the conditions of reaction.

4. The process of claim 2 in which natural bitumen is treated with methane in the presence of at least one liquid phase which is physically constant under the conditions of reaction.

5. The process of claim 2, in which asphalt is treated with methane in the presence of at least one liquid phase which is physically constant under the conditions of reaction.

6. The process of claim 2 in which a mixture of bitumen and asphalt is treated with methane in the presence of at least one liquid phase which is physically constant under the conditions of reaction.

7. The process of claim 2 in which a mineral oil is treated with methane in the presence of at least one liquid phase which is physically constant under the conditions of reaction.

8. The process of claim 2 in which a tar is treated with methane in the presence of at least one liquid phase which is physically constant under the conditions of reaction.

9. The process of claim 1, in which the treatment is effected in a heterogeneous system, at least one liquid phase participating in the reaction.

10. The process of claim 1, in which the treatment is effected in a heterogeneous system, at least one liquid phase being formed by an added substance which is liquid under the conditions of the reaction.

11. The process of claim 1, in which the partial pressure of the methane is chosen far higher than the sum of the partial pressures of the gaseous compounds reacted with it.

12. The process of claim 1 in which elementary carbon is treated with methane in the presence of at least one liquid phase which is physically constant under the conditions of reaction.

13. The process of producing hydrocarbons from other carbonaceous materials, which comprises acting upon such material at an elevated temperature not exceeding 390° C. with a gas mixture, which contains a material proportion of methane and more than 20 per cent by volume ethylene, under a total pressure of at least 250 atmospheres and under a partial pressure of methane which suffices to cause a polarization of the methane present.

14. The process of producing hydrocarbons from other carbonaceous materials, which comprises acting upon such material at an elevated temperature not exceeding 390° C. with a gas mixture, which contains a material proportion of methane and more than 20 per cent by volume acetylene, under a total pressure of at least 250 atmospheres and under a partial pressure of methane which suffices to cause a polarization of the methane present.

15. The process of producing hydrocarbons from other carbonaceous materials, which comprises acting upon such material at an elevated temperature not exceeding 390° C. with a gas mixture, which contains a material proportion of methane and more than 20 per cent by volume ethylene and acetylene, under a total pressure of at least 250 atmospheres and under a partial pressure of methane which suffices to cause a polarization of the methane present.

EULAMPIU SLATINEANU.